(12) United States Patent
Chen et al.

(10) Patent No.: US 12,541,100 B2
(45) Date of Patent: Feb. 3, 2026

(54) EYE TRACKING USING SELF-MIXING INTERFEROMETRY

(71) Applicant: Apple Inc., Cupertino, CA (US)

(72) Inventors: Tong Chen, Fremont, CA (US); Mark T. Winkler, San Jose, CA (US); Edward Vail, Menlo Park, CA (US); Xibin Zhou, Palo Alto, CA (US); Ahmet Fatih Cihan, San Jose, CA (US); Walter Nistico, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/105,709

(22) Filed: Feb. 3, 2023

(65) Prior Publication Data

US 2023/0333371 A1 Oct. 19, 2023

Related U.S. Application Data

(63) Continuation of application No. 17/947,874, filed on Sep. 19, 2022, now abandoned.
(Continued)

(51) Int. Cl.
*G02B 27/00* (2006.01)
*G02B 27/01* (2006.01)

(52) U.S. Cl.
CPC ..... *G02B 27/0093* (2013.01); *G02B 27/0172* (2013.01); *G02B 2027/0138* (2013.01)

(58) Field of Classification Search
CPC .............. G02B 27/01; G02B 27/0101; G02B 27/0103; G02B 27/0134; G02B 27/0136;
(Continued)

(56) References Cited

U.S. PATENT DOCUMENTS 11,419,546 B2 * 8/2022 Cihan ................ A61B 5/02438
11,435,820 B1 * 9/2022 Hirsh ..................... G06F 3/0346
(Continued)

FOREIGN PATENT DOCUMENTS

CN 109715047 5/2019
KR 2021-0031597 3/2021
(Continued)

OTHER PUBLICATIONS

Meyer et al.; "A Novel-Eye-Tracking Sensor for AR Glasses Based on Laser Self-Mixing Showing Exceptional Robustness Against Illumination"; ETRA; '20 Short Papers; Jun. 2-5, 2020; Stuttgart, Germany; 5 pgs.
(Continued)

*Primary Examiner* — Ke Xiao
*Assistant Examiner* — Nelson Lam
(74) *Attorney, Agent, or Firm* — Brownstein Hyatt Farber Schreck, LLP

(57) ABSTRACT

An eye tracking device includes a head-mountable frame, an optical sensor subsystem mounted to the head-mountable frame, and a processor. The optical sensor subsystem includes a set of one or more SMI sensors. The processor is configured to operate the optical sensor subsystem to cause the set of one or more SMI sensors to emit a set of one or more beams of light toward an eye of a user; to receive a set of one or more SMI signals from the set of one or more SMI sensors; and to track a movement of the eye using the set of one or more SMI signals.

22 Claims, 14 Drawing Sheets

Related U.S. Application Data

(60) Provisional application No. 63/247,188, filed on Sep. 22, 2021.

(58) Field of Classification Search
CPC .............. G02B 27/0138; G02B 27/017; G02B 27/0172; G02B 27/0176; G02B 27/0179; G02B 27/0189; G02B 2027/0174; G02B 2027/0178; G02B 2027/0181; G02B 2027/0183
USPC .......................................................... 345/7–9
See application file for complete search history.

(56) References Cited

U.S. PATENT DOCUMENTS

| | | | | |
|---|---|---|---|---|
| 11,625,095 | B2 * | 4/2023 | Konrad | G06F 3/165 |
| | | | | 345/156 |
| 11,874,110 | B2 * | 1/2024 | Chen | G01B 9/02091 |
| 11,909,171 | B2 * | 2/2024 | Chen | G01S 7/4812 |
| 12,209,890 | B2 * | 1/2025 | Chen | G01D 5/266 |
| 2014/0071400 | A1 | 3/2014 | Gao | |
| 2016/0109961 | A1 * | 4/2016 | Parshionikar | G06F 3/013 |
| | | | | 345/156 |
| 2018/0068449 | A1 | 3/2018 | Malaika et al. | |
| 2018/0129279 | A1 | 5/2018 | Melman | |
| 2020/0149864 | A1 * | 5/2020 | Kinrot | A61B 3/102 |
| 2020/0160566 | A1 * | 5/2020 | Moench | G02B 27/017 |
| 2020/0319082 | A1 * | 10/2020 | Mutlu | G01S 17/58 |
| 2020/0356159 | A1 * | 11/2020 | Mutlu | G06F 3/0423 |
| 2021/0010797 | A1 * | 1/2021 | Cihan | H04R 23/008 |
| 2021/0072833 | A1 * | 3/2021 | Mutlu | G06F 3/017 |
| 2021/0132690 | A1 * | 5/2021 | Yudanov | G06F 3/0487 |
| 2021/0271320 | A1 * | 9/2021 | Fiess | G02B 27/0093 |
| 2021/0302745 | A1 * | 9/2021 | Mutlu | G02B 27/0172 |
| 2022/0099431 | A1 * | 3/2022 | Chen | A61B 5/0059 |
| 2022/0244036 | A1 * | 8/2022 | Scheller | G01B 11/22 |
| 2022/0299761 | A1 * | 9/2022 | Scheller | G02B 27/0093 |
| 2022/0400946 | A1 * | 12/2022 | Mujat | A61B 5/14555 |
| 2024/0310906 | A1 * | 9/2024 | Najer | G02B 27/0093 |

FOREIGN PATENT DOCUMENTS

| | | |
|---|---|---|
| RU | 2017 143 204 | 6/2019 |
| WO | WO 2021/163713 | 8/2021 |

OTHER PUBLICATIONS

Tingting et al.; "The Application of Eye Tracking Technology in Information Behavior Research"; Journal of the China Society of Scientific and Technical Information; Feb. 2020; 39(2): 217-230; 14 pgs.

* cited by examiner

EYE TRACKING USING SELF-MIXING INTERFEROMETRY

CROSS-REFERENCE TO RELATED APPLICATIONS

This application is a continuation of U.S. patent application Ser. No. 17/947,874, filed Sep. 19, 2022, which is a nonprovisional and claims the benefit under 35 U.S.C. § 119(e) of U.S. Provisional Patent Application No. 63/247,188, filed Sep. 22, 2021, the contents of which are incorporated herein by reference.

FIELD

The described embodiments generally relate to optical sensing and, more particularly, to tracking eye movement using optical sensors.

BACKGROUND

Eye monitoring technologies can be used to improve near-eye displays (e.g., head-mounted displays (HMDs)), augmented reality (AR) systems, virtual reality (VR) systems, and so on. For example, gaze vector tracking, also known as gaze position tracking, can be used as an input for display fovea rendering or human-computer interaction. Traditional eye monitoring technologies are camera-based or video-based and rely on active illumination of an eye, eye image acquisition, and extraction of eye features such as a pupil center and cornea glints. The power consumption, form factor, computational cost, and latency of such eye monitoring technologies can be a significant burden for more user-friendly next generation HMD, AR, and VR systems (e.g., lighter weight, battery-operated, and more fully featured systems).

SUMMARY

Embodiments of the systems, devices, methods, and apparatus described in the present disclosure utilize one or more self-mixing interferometry (SMI) sensors to track eye movement. In some embodiments, SMI sensors can be used alone, or in combination with a camera, to also determine a gaze vector or eye position.

In a first aspect, the present disclosure describes an eye tracking device. The eye tracking device may include a head-mountable frame, an optical sensor subsystem mounted to the head-mountable frame, and a processor. The optical sensor subsystem may include a set of one or more SMI sensors. The processor may be configured to operate the optical sensor subsystem to cause the set of one or more SMI sensors to emit a set of one or more beams of light toward an eye of a user; to receive a set of one or more SMI signals from the set of one or more SMI sensors; and to track a movement of the eye using the set of one or more SMI signals.

In a second aspect, the present disclosure describes another eye tracking device. The eye tracking device may include a set of one or more SMI sensors, a camera, and a processor. The processor may be configured to cause the camera to acquire, at a first frequency, a set of images of an eye of a user; cause a set of one or more SMI sensors to emit a set of one or more beams of light toward an eye of a user; sample, at a second frequency greater than the first frequency, a set of one or more SMI signals generated by the set of one or more SMI sensors; determine a gaze vector of the eye using at least one image in the set of images; and track a movement of the eye using the set of one or more SMI signals.

In a third aspect, the present disclosure describes a method of tracking movement of an eye. The method may include operating an optical sensor subsystem to cause a set of one or more SMI sensors in the optical sensor subsystem to emit a set of one or more beams of light toward an eye of a user; receiving a set of one or more SMI signals from the set of one or more SMI sensors; and tracking a movement of the eye using the set of one or more SMI signals.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1:
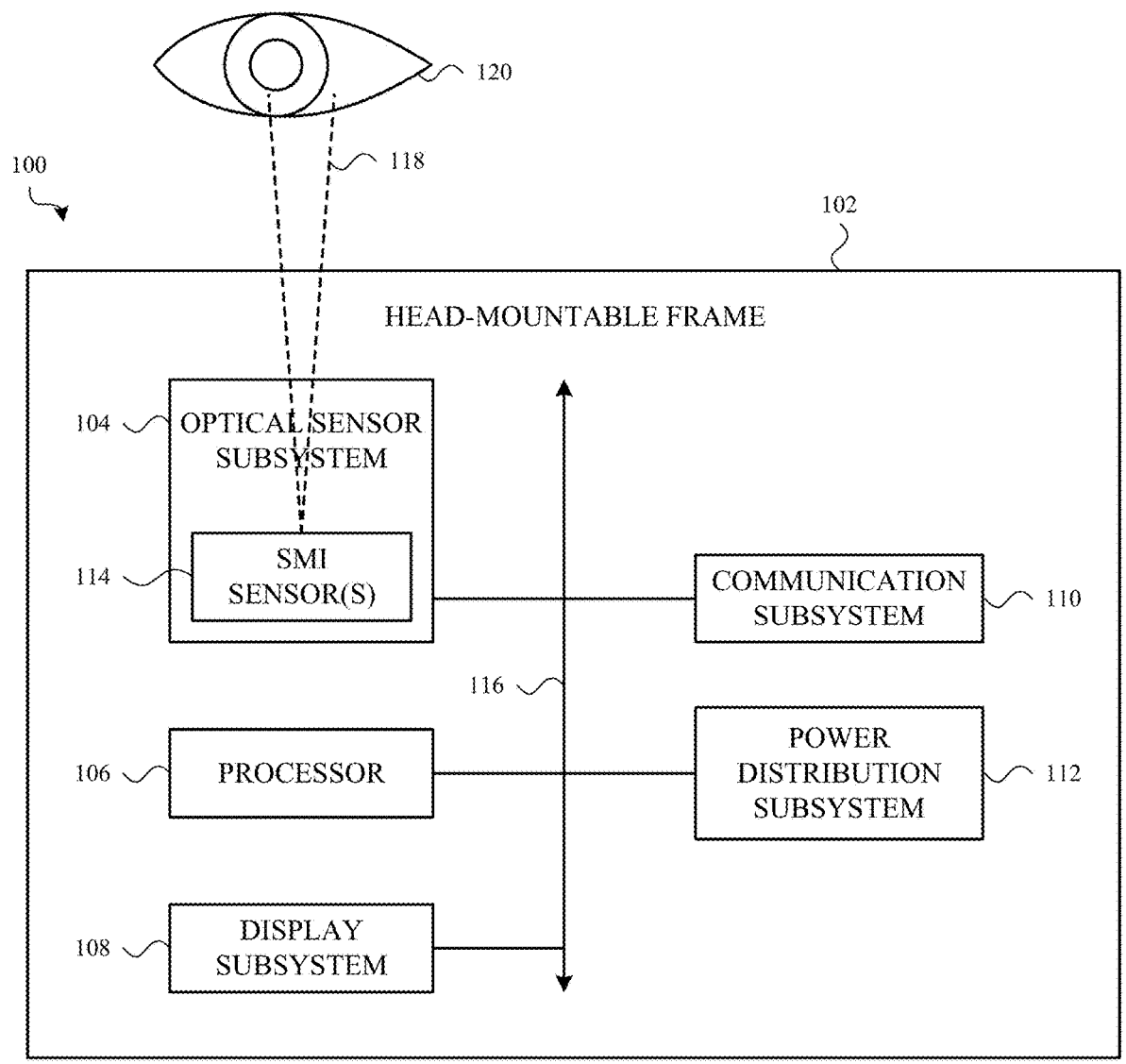
FIG. 1 shows an example block diagram of an eye tracking device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Most eye tracking systems are camera or image based and cannot track eye movements fast enough, or with high enough accuracy, using a reasonable amount of power. Lower power and lower cost systems, with higher accuracy and sensitivity, are needed.

Fast and accurate detection and classification of eye movements, such as distinguishing between smooth pursuit, saccade, fixation, nystagmus, and blinking, can be mission critical, but can also be challenging for camera-based, video-based, or photodetector-based tracking systems—especially under a stringent power budget. For example, fixation can be as short as a few tens of microseconds and as subtle as <0.25 degrees per second (deg/s) or <0.5 deg/s. Detection of such an eye movement suggests that a high resolution and high frame rate image acquisition and processing system is needed.

Previously, low power imaging-based eye odometry has been proposed, with reduced resolution and higher frame rate image captures being fused with higher resolution and lower frame rate image captures for an overall power savings (e.g., as compared to systems that only acquire higher resolution images at a higher frame rate). As an alternative, photodiode array-based eye trackers having lower latency and lower power consumption have been proposed, but have yet to be proven useful in higher resolution and higher accuracy applications. Photodiode array-based eye trackers are thus more suitable in binary sensing applications, such as waking up a mission critical video-based eye tracker, or in near eye display (or HMD) systems that rely on coarse gaze zone detection or gaze movement thresholding.

The following description relates to tracking eye movement using SMI sensors—alone or in combination with other sensors, such as a camera or other image-based sensor. For purposes of this description, an SMI sensor is considered to include a light emitter (e.g., a laser light source) and an SMI signal detector (e.g., a light detector, such as a photodiode, or an electrical detector, such as a circuit that measures the junction voltage or drive current of a light emitter). Each of one or more SMI sensors may emit one or more fixed or scanned beams of light toward one or more structures of a user's eye (e.g., toward one or more of the eye's iris, sclera, pupil, lens, limbus, eyelid, and so on). The SMI sensor(s) may be operated in compliance with operational safety specifications, so as to not harm a user's eye.

After emitting a beam of light, an SMI sensor may receive a retroreflected portion of the emitted light back into its resonant cavity. For a good quality retroreflection, it can be useful to focus the beam of light emitted by an SMI sensor on an eye's iris or sclera (or another diffuse structure) versus focusing the beam of light on the eye's cornea or pupil. The phase change of the retroreflected portion of the emitted light may mix with the phase of the light that is generated within the resonant cavity, and may produce an SMI signal that can be amplified and detected. The amplified SMI signal, and in some cases multiple SMI signals, may be analyzed. Rotational movement of the eye can be retrieved and reconstructed by phase tracking the Doppler frequencies from multiple orientations and positions of a user's eye.

Classification and quantification of user gazing behavior, such as smooth pursuit, saccade, fixation, nystagmus, and blinking, can be identified at a high sampling rate using SMI sensors, to facilitate high efficiency, high fidelity, digital content rendering of numbers, text, or images on a near eye display (or HMD) system.

In some embodiments, SMI sensor data or determinations may be fused with absolute gaze direction sensing information (e.g., gaze vector sensing or gaze position sensing) acquired from a lower sampling rate gaze imaging system (e.g., a camera), enabling absolute gaze tracking at a much higher speed and good accuracy. In contrast to the imaging system, which may include a million or more pixels, the SMI sensor data can be obtained from one or a few (e.g., two or three) SMI sensors. This can enable the SMI sensors to generate SMI signals (or SMI sensor data) with vastly lower power consumption compared to the imaging system.

When the wavelength of the beam of light emitted by an SMI sensor is modulated, an SMI signal obtained from the SMI sensor may be used for absolute ranging of surface, interface, and volume structures of a user's eyes, on the order of ~100 µm level resolution. Such absolute distance measurements can provide an anchor for tracking the displacement of an eye profile during eye rotation.

When the wavelength(s) of the beam(s) of light emitted by one or more SMI sensors are modulated, and when a beam of light emitted by at least one SMI sensor is scanned and/or multiple beams are emitted, a displacement and/or velocity map, also known as a Doppler cloud, and/or a distance map, also known as a depth cloud, may be obtained or constructed. Additionally or alternatively, the Doppler cloud may also be obtained or constructed when the wavelength(s) of the beam(s) of light emitted by the one or more SMI sensors are not modulated. The Doppler cloud may have a native high resolution, which, for example, may be of µm or sub-µm level for a single frame displacement, or down to a mm/s or deg/s level for velocity. A single or multiple frames of a Doppler cloud may be considered a differential depth cloud. Additionally, or alternatively, measurements of a single or multiple frames of a Doppler cloud may be processed in real-time for matching a pre-defined and/or locally calibrated differential map or library and extracting eye tracking information and/or position information (that is also known as posing information). A locally calibrated differential map or library may be obtained by means including, but not limited to, a camera, a depth cloud, and so on. Use of a Doppler cloud, either alone or fused with a depth cloud or other sensing modality (e.g., an eye camera image, a motion sensor, and so on), may provide an accurate and efficient way of tracking eye movement or position information.

These and other systems, devices, methods, and apparatus are described with reference to FIGS. 1-12B. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "above", "below", "left", "right", etc. is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

FIG. 1 shows an example block diagram of an eye tracking device 100. The eye tracking device 100 may include a head-mountable frame 102, an optical sensor subsystem 104 mounted to the head-mountable frame 102, and a processor 106. In some embodiments, the eye tracking device 100 may also include one or more of a display subsystem 108, a communication subsystem 110 (e.g., a wireless and/or wired communication subsystem), and a power distribution subsystem 112. The processor 106, display subsystem 108, communication subsystem 110, and power distribution subsystem 112 may be partly or wholly mounted to the head-mountable frame 102, or in radio frequency or electrical communication with one or more components mounted to the head-mountable frame 102 (e.g., housed in a box or electronic device (e.g., a phone, or a wearable device such as a watch) that is in radio frequency (i.e., wireless) or electrical (e.g., corded) communication with one or more components mounted to the head-mountable frame 102), or distributed between the head-mountable frame 102 and a box or electronic device that is in radio frequency or electrical communication with one or more components mounted to the head-mountable frame 102. The optical sensor subsystem 104, processor 106, display subsystem 108, communication subsystem 110, and/or power distribution subsystem 112 may communicate over one or more buses 116, or over the air (e.g., wirelessly), using one or more communication protocols.

The head-mountable frame 102 may take the form of a pair of glasses, a set of goggles, an augmented reality (AR) headset, a virtual reality (VR) headset, or other form of head-mountable frame 102.

The optical sensor subsystem 104 may include a set of one or more SMI sensors 114. Each SMI sensor in the set of one or more SMI sensors may include a light emitter and a light detector. The light emitter may include one or more of a vertical-cavity surface-emitting laser (VCSEL), an edge-emitting laser (EEL), a vertical external-cavity surface-emitting laser (VECSEL), a quantum-dot laser (QDL), a quantum cascade laser (QCL), or a light-emitting diode (LED) (e.g., an organic LED (OLED), a resonant-cavity LED (RC-LED), a micro LED (mLED), a superluminescent LED (SLED), or an edge-emitting LED), and so on. The light detector (or photodetector) may in some cases be positioned laterally adjacent the light emitter (e.g., mounted or formed on a substrate on which the light detector is mounted or formed). In other cases, the light detector may be stacked above or below the light emitter. For example, the light detector may be a VCSEL, HCSEL, or EEL having a primary emission and a secondary emission, and the light detector may be epitaxially formed in the same epitaxial stack as the light emitter, such that the light detector receives some or all of the secondary emission. In these latter embodiments, the light emitter and light detector may be similarly formed (e.g., both the light emitter and the light detector may include multiple quantum well (MQW) structures, but the light emitter may be forward-biased and the light detector (e.g., a resonant cavity photodetector (RCPD) may be reverse-biased). Alternatively, the light detector may be formed on a substrate and the light emitter may be separately formed and mounted to the substrate, or in relation to the light emitter, such that a secondary light emission of the light emitter impinges on the light detector. Alternatively, the light emitter may be formed on a substrate and the light detector may be separately formed and mounted to the substrate, or in relation to the light emitter, such that secondary light emission of the light emitter impinges on the light detector.

In some embodiments, the optical sensor subsystem 104 may include a set of stationary or movable optical components (e.g., one or more lenses, optical gratings, optical filters, beam splitters, beam steering components, and so on). The optical sensor subsystem 104 may also include an image sensor (e.g., a camera including an image sensor).

The processor 106 may include any electronic device capable of processing, receiving, or transmitting data or instructions, whether such data or instructions are in the form of software or firmware or otherwise encoded. For example, the processor 106 may include a microprocessor, a central processing unit (CPU), an application-specific integrated circuit (ASIC), a digital signal processor (DSP), a controller, or a combination of such devices. As described herein, the term "processor" is meant to encompass a single processor or processing unit, multiple processors, multiple processing units, or other suitably configured computing elements.

The components of the eye tracking device 100 can be controlled by multiple processors in some embodiments. For example, select components of the eye tracking device 100 (e.g., the optical sensor subsystem 104) may be controlled by a first processor and other components of the eye tracking device (e.g., the display subsystem 108 and/or communication subsystem 110) may be controlled by a second processor, where the first and second processors may or may not be in communication with each other.

In some embodiments, the display subsystem 108 may include a display having one or more light-emitting elements including, for example, LEDs, OLEDs, a liquid crystal display (LCD), an electroluminescent (EL) display, or other types of display elements.

The communication subsystem 110 may enable the eye tracking device 100 to transmit or receive data from a user or another electronic device. The communication subsystem 110 may include a touch sensing input surface, a crown, one or more microphones or speakers, or a wired or wireless (e.g., radio frequency (RF) or optical) communications interface configured to transmit electronic, RF, or optical signals. Examples of wireless and wired communications interfaces include, but are not limited to, cellular, Wi-Fi, and BLUETOOTH® communications interfaces.

The power distribution subsystem 112 may be implemented with any collection of power sources and/or conductors capable of delivering energy to the eye tracking device 100 or components thereof. In some cases, the power distribution subsystem 112 may include one or more batteries or rechargeable batteries. Additionally or alternatively, the power distribution subsystem 112 may include a power connector or power cord that can be used to connect the eye tracking device 100 or its components to a remote power source, such as a wall outlet, remote battery pack, or electronic device to which the eye tracking device 100 is tethered.

The processor 106 may be configured to operate the optical sensor subsystem 104. Operating the optical sensor subsystem 104 may include causing the power distribution subsystem 112 to power the optical sensor subsystem 104, providing control signals to the set of one or more SMI sensors 114, and/or providing control signals that electrically, electromechanically, or otherwise focus or adjust optical components of the optical sensor subsystem 104. Operating the optical sensor subsystem 104 may cause the set of one or more SMI sensors 114 to emit a set of one or more beams of light 118 toward an eye 120 of a user. The processor 106 may also be configured to receive a set of one or more SMI signals from the set of one or more SMI sensors 114 and track a rotational movement of the eye 120 using the set of one or more SMI signals.

In some cases, the optical sensor subsystem 104, processor 106, display subsystem 108, communication subsystem 110, and/or power distribution subsystem 112 may communicate over one or more busses, which are generally portrayed as bus 116.

Tracking the rotational movement of the eye 120 may in some cases include estimating an angular velocity (or gaze movement) of the eye 120. In some cases, an angular velocity may be tracked in each of three orthogonal directions (e.g., in x, y, and z directions). Tracking angular velocities in different directions may require scanning one or more beams of light emitted by the set of one or more SMI sensors 114, splitting one or more beams of light emitted by one or more SMI sensors in the set of one or more SMI sensors 114, or configuring the set of one or more SMI sensors 114 to emit two or more beams of light in different directions (and preferably in different orthogonal directions).

Tracking the rotational movement of the eye 120 may also include tracking a gaze (or gaze position) of the eye 120.

In some embodiments, the processor 106 may be configured to classify the rotational eye movement of the user. For example, the rotational eye movement may be classified as at least one of smooth pursuit, saccade, fixation, nystagmus, or blinking. The processor 106 may then cause the display subsystem 108 to adjust the rendering of one or more images on the display in response to the classification of the rotational eye movement. In some embodiments, the processor 106 may be further configured to quantify the classified rotational eye movement (e.g., how fast or how much is the user blinking, what is the angular velocity of the user's eye movement, or how often or fast is the angular velocity of the user's eye 120 changing), and the rendering of the one or more images may be further adjusted in response to the quantified rotational eye movement.

In some embodiments, the processor 106 may be configured to cause the display subsystem 108 to change a state of the display in response to the movement of the eye 120. Changing the state of the display may include changing what is displayed, but may also or alternatively include transitioning the display from a low power or OFF state to a higher power or ON state or, alternatively, transitioning the display from the higher power or ON state to the low power or OFF state.

In some embodiments, the display may include an array of display pixels mounted on a substrate, and the set of one or more SMI sensors 114 may include at least one SMI sensor mounted on the substrate, adjacent to or within the array of display pixels. In other embodiments, the SMI sensor(s) 114 may be provided apart from the display.

Figure 2A:
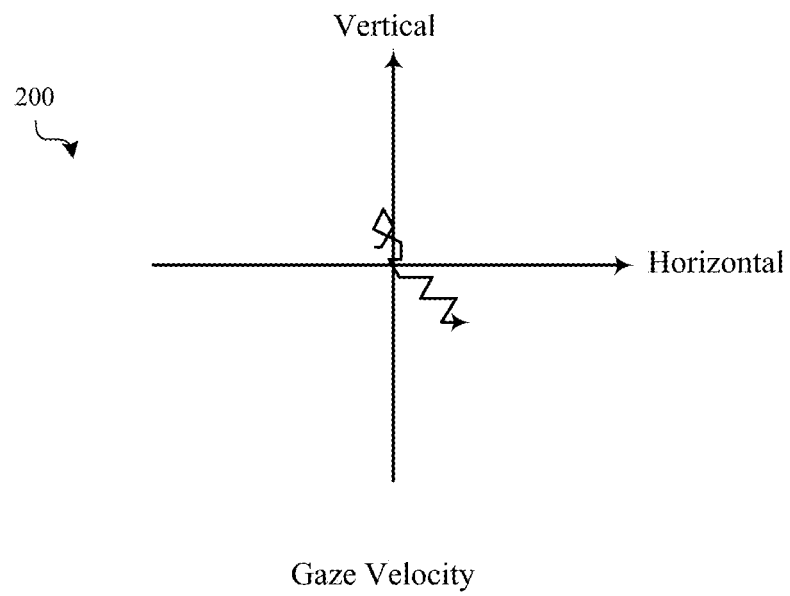
FIG. 2A shows an example graph of a tracked angular velocity of an eye.

FIG. 2A shows an example graph 200 of a tracked angular velocity (or gaze movement) of an eye. By way of example, the graph 200 illustrates the tracking of angular velocity in only two orthogonal directions. When the exterior surface or another structure of the eye is modeled as a two-dimensional object, angular velocity may only be tracked in two dimensions. Alternatively, angular velocity may be more accurately tracked in three dimensions.

Figure 2B:
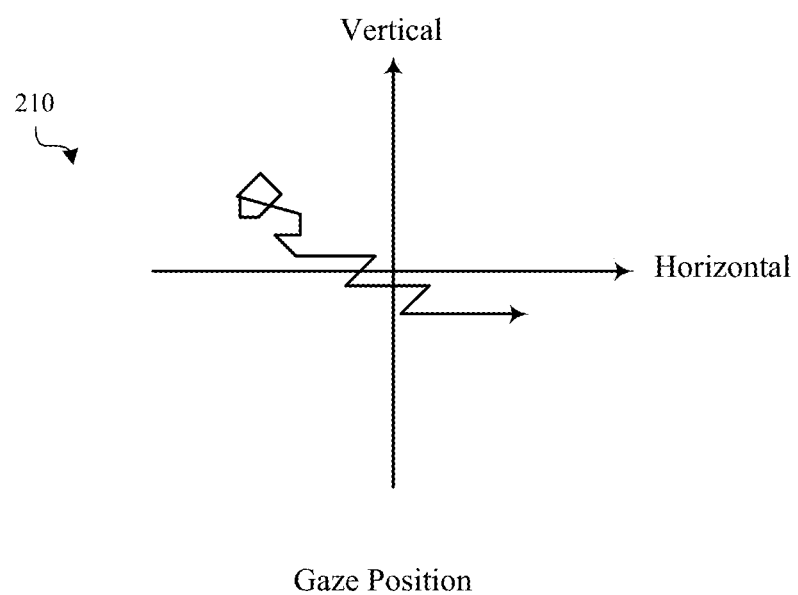
FIG. 2B shows an example graph of a tracked gaze of an eye.

FIG. 2B shows an example graph 210 of a tracked gaze (or gaze vector, or gaze position) of an eye. By way of example, the graph 210 illustrates the tracking of a gaze in only two orthogonal directions. When the exterior surface or another structure of the eye is modeled as a two-dimensional object, a gaze may only be tracked in two dimensions. Alternatively, a gaze may be more accurately tracked in three dimensions.

SMI-based sensing can be especially useful when a device or application needs to detect and/or classify subtle eye movements such as smooth pursuit, saccade, fixation, nystagmus, and blinking, because all of these eye movements can be detected and classified by tracking the angular velocity of an eye, and SMI-based sensing is typically faster, more accurate, and more power efficient (e.g., consumes less power) than video-based or photodetector-based sensing when it comes to detecting changes in the angular velocity of an eye. Furthermore, with initial and periodic (low frequency) calibration of gaze position, high frequency gaze position vector tracking, as shown in FIG. 2B, can be obtained from an integration of gaze velocity vector tracking, as shown in FIG. 2A.

Figure 3A:
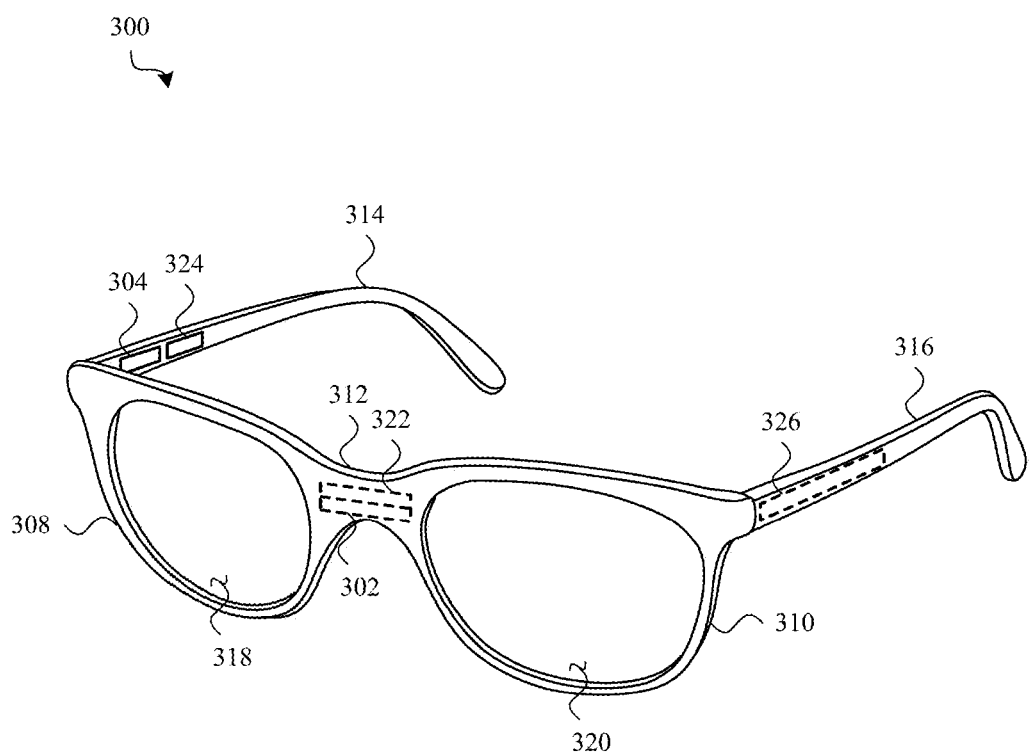
FIG. 3A shows a first example eye tracking device in which an optical sensing subsystem and processor are mounted to a pair of glasses.

FIG. 3A shows a first example eye tracking device in which an optical sensing subsystem 302 and processor 304 are mounted to a pair of glasses 300. By way of example, the glasses 300 (i.e., a type of head-mountable frame) are shown to include a first lens rim 308 and a second lens rim 310, a bridge 312 connecting the first lens rim 308 to the second lens rim 310, a first temple 314 connected to the first lens rim 308, and a second temple 316 connected to the second lens rim 310. In some embodiments, the glasses 300 may include a heads-up display or function as AR glasses.

Each of the first lens rim 308 and the second lens rim 310 may hold a respective lens, such as a first lens 318 or a second lens 320. The lenses 318, 320 may or may not magnify, focus, or otherwise alter light passing through the lenses 318, 320. For example, the lenses 318, 320 may correct a user's vision, block bright or harmful light, or simply provide a physical barrier through which light can pass with no or minimal adjustment. In some embodiments, the first and second lenses 318, 320 may be formed of glass or plastic. In some embodiments, the first and/or second lenses 318, 320 may function as a display (e.g., a passive display screen) on which text, numbers, and/or images are projected by a display subsystem 322, which display subsystem 322 may also be mounted to the pair of glasses. Alternatively, the first and/or second lens rims 308, 310 may hold a transparent or translucent display (e.g., light-emitting diodes (LEDs), organic LEDs (OLEDs), or other light-emitting elements that can be operated by the display subsystem 322 to display text, numbers, and/or images.

By way of further example, the optical sensing subsystem 302 may be configured as described with reference to one or more of FIGS. 1 and 5-9B, and/or the processor 304 may be configured to operate as described with reference to FIGS. 1 and 10-12B. One or more components (e.g., SMI sensors, optical components, a camera, and so on) of the optical sensing subsystem 302 may be mounted on one or more substrates attached to the first lens rim 308, second lens rim 310, bridge 312, first temple 314, second temple 316, first lens 318, or second lens 320, or may be mounted directly to one or more of these components. Similarly, the processor 304, display subsystem 322, a communication subsystem 324, and/or a power distribution subsystem 326 may be mounted to one or more of these components. In some embodiments, part or all of the optical sensing subsystem 302, processor 304, display subsystem 322, communication subsystem 324, and/or power distribution subsystem 326 may be mounted within one or more components of the glasses 300, within a device that is wirelessly or electrically connected to one or more components mounted to the glasses 300 (e.g., in a user's phone or wearable device), or distributed between the glasses 300 and the device that is wirelessly or electrically connected to one or more components of the glasses 300.

The processor 304, display subsystem 322, communication subsystem 324, and power distribution subsystem 326 may be further configured or operated as described with reference to FIG. 1.

Figure 3B:
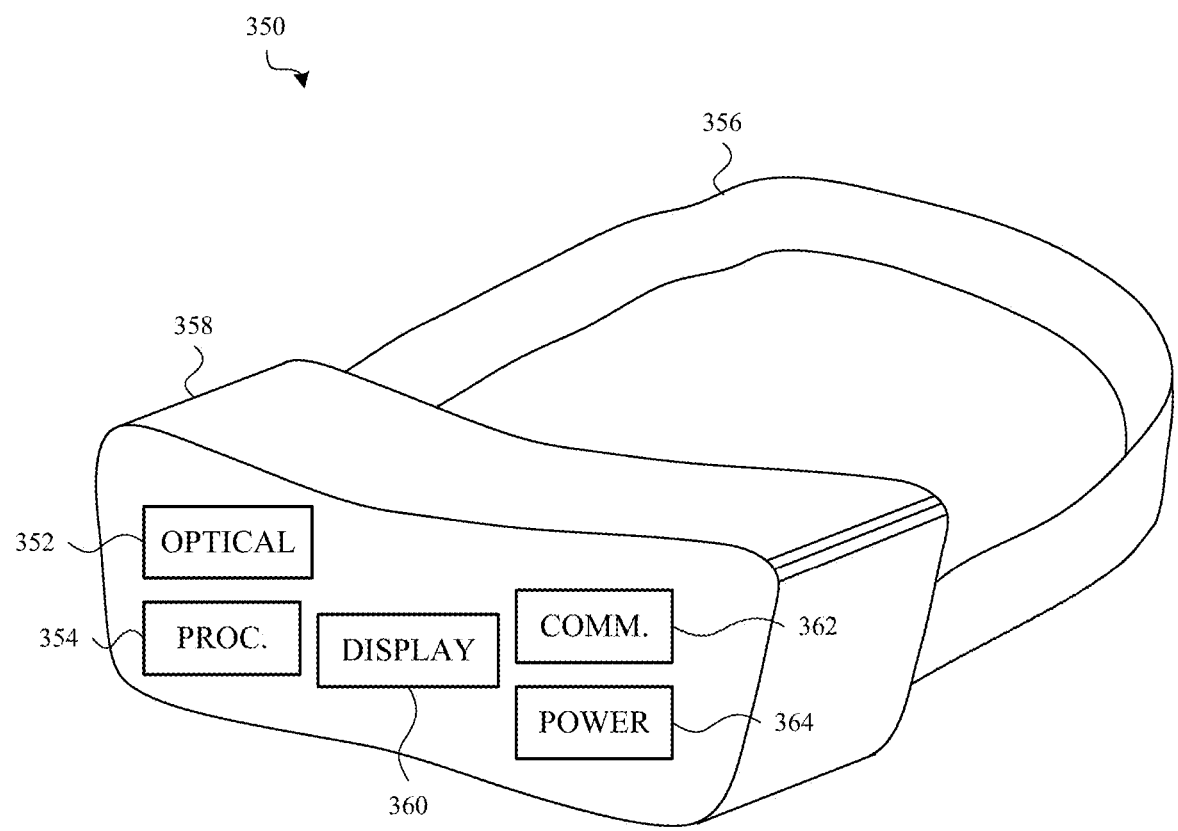
FIG. 3B shows a second example eye tracking device in which an optical sensing subsystem and processor are mounted to a VR headset.

FIG. 3B shows a second example eye tracking device in which an optical sensing subsystem 352 and processor 354 are mounted to a virtual reality (VR) headset 350. By way of example, the VR headset 350 (i.e., a type of head-mountable frame) is shown to include a VR module 358 that can be attached to a user's head by a strap 356.

The VR module 358 may include a display subsystem 360. The display subsystem 360 may include a display for displaying text, numbers, and/or images.

By way of example, the optical sensing subsystem 352 may be configured as described with reference to one or more of FIGS. 1 and 5-9B, and/or the processor 354 may be configured to operate as described with reference to FIGS. 1 and 10-12B. One or more components (e.g., SMI sensors, optical components, a camera, and so on) of the optical sensing subsystem 352 may be mounted on one or more substrates attached to the VR module 358, or may be mounted directly to a housing of the VR module 358. Similarly, the processor 354, display subsystem 360, a communication subsystem 362, and/or a power distribution subsystem 364 may be mounted to the VR module 358. In some embodiments, part or all of the optical sensing subsystem 352, processor 354, display subsystem 360, communication subsystem 362, and/or power distribution subsystem 364 may be mounted within a device that is wirelessly or electrically connected to the VR module 358 (e.g., in a user's phone or wearable device), or distributed between the VR module 358 and the device that is wirelessly or electrically connected to the VR module 358.

The processor 354, display subsystem 360, communication subsystem 362, and power distribution subsystem 364 may be further configured or operated as described with reference to FIG. 1.

Figure 4A:
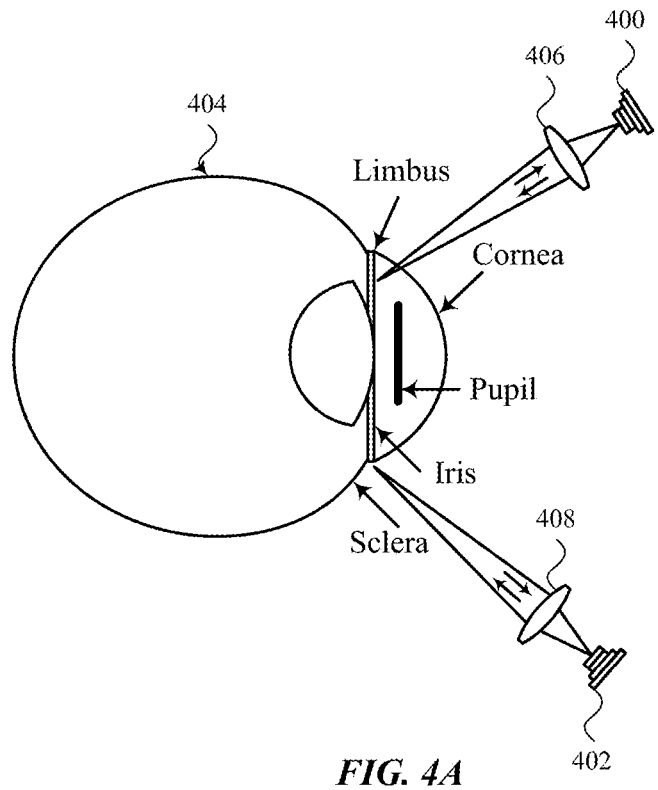
FIG. 4A shows a side elevation view of an example set of SMI sensors that may be mounted to a head-mountable frame and configured to emit light toward an eye.
Figure 4B:
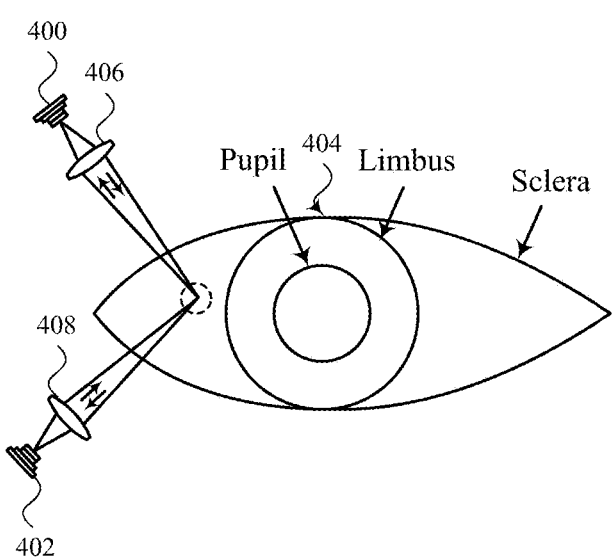
FIG. 4B shows a front elevation view of the eye and set of SMI sensors shown in FIG. 4A.

FIGS. 4A and 4B show an example set of SMI sensors 400, 402 that may be mounted to a head-mountable fame, such as one of the head-mountable frames described with reference to FIGS. 1-3B. The set of SMI sensors 400, 402 may form part of an optical sensor subsystem, such as one of the optical subsystems described with reference to FIGS. 1-3B or elsewhere herein. The set of SMI sensors 400, 402 may be configured to emit light toward an eye 404. FIG. 4A shows a side elevation view of the eye 404 and set of SMI sensors 400, 402, and FIG. 4B shows a front elevation view of the eye 404 and set of SMI sensors 400, 402.

By way of example, the set of SMI sensors 400, 402 is shown to include two SMI sensors in FIGS. 4A and 4B (e.g., a first SMI sensor 400 and a second SMI sensor 402). In other embodiments, the set of SMI sensors 400, 402 may include more or fewer SMI sensors. The first SMI sensor 400 and second SMI sensor 402 may emit respective beams of light toward the eye 404. In some embodiments, the beams of light may be oriented in different directions, which different directions may or may not be orthogonal directions. When the beams of light are oriented in different directions, a processor that receives SMI signals generated by the SMI sensors 400, 402 may track movement of the eye 404 in two dimensions (e.g., the processor may tack angular velocities of the eye 404 in two dimensions). The beams of light may impinge on the eye 404 at the same or different locations. By way of example, the beams of light are shown to impinge on the eye 404 at a same location.

In some embodiments, the light emitted by the SMI sensors 400, 402 may be directed or filtered by optics 406 or 408 (e.g., one or more lenses or beam steering components or other optic components).

Figure 5:
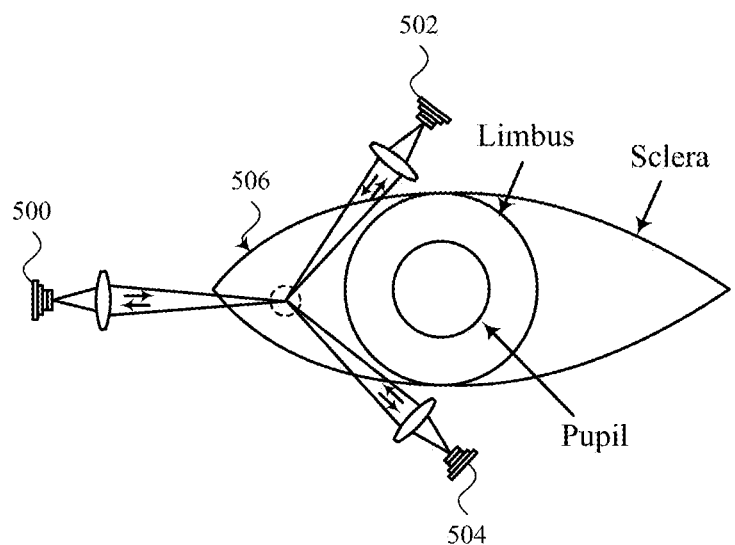
FIG. 5 shows an example front elevation view of a first alternative set of SMI sensors that may be mounted to a head-mountable frame and configured to emit light toward an eye.

FIG. 5 shows a front elevation view of an alternative set of SMI sensors 500, 502, 504 that may be mounted to a head-mountable frame, such as one of the head-mountable frames described with reference to FIGS. 1-3B. The set of SMI sensors 500, 502, 504 may form part of an optical sensor subsystem, such as one of the optical subsystems described with reference to FIGS. 1-3B or elsewhere herein. The set of SMI sensors 500, 502, 504 may be configured to emit light toward an eye 506.

In contrast to the set of SMI sensors described with reference to FIGS. 4A and 4B, the set of SMI sensors 500, 502, 504 shown in FIG. 5 includes three SMI sensors (e.g., a first SMI sensor 500, a second SMI sensor 502, and a third SMI sensor 504). The first SMI sensor 500, second SMI sensor 502, and third SMI sensor 504 may emit respective beams of light toward the eye 506. In some embodiments, the beams of light may be oriented in different directions, which different directions may or may not be orthogonal directions. When the beams of light are oriented in different directions, a processor that receives SMI signals generated by the SMI sensors 500, 502, 504 may track movement of the eye 506 in three dimensions (e.g., the processor may tack angular velocities of the eye 506 in three dimensions). The beams of light may impinge on the eye 506 at the same or different locations. By way of example, the beams of light are shown to impinge on the eye 506 at a same location.

Figure 6:
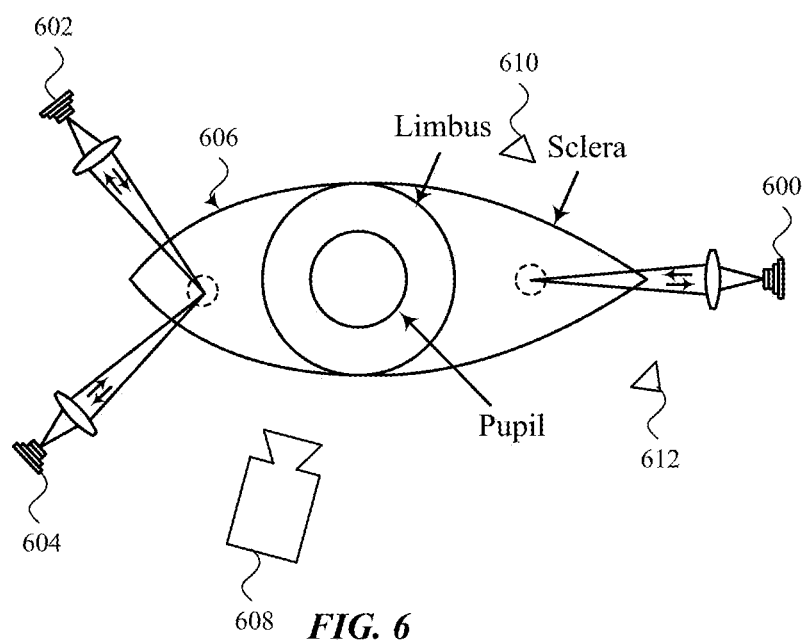
FIG. 6 shows an example front elevation view of a second alternative set of SMI sensors that may be mounted to a head-mountable frame and configured to emit light toward an eye.

FIG. 6 shows an example front elevation view of a second alternative set of SMI sensors 600, 602, 604 that may be mounted to a head-mountable frame, such as one of the head-mountable frames described with reference to FIGS. 1-3B. The set of SMI sensors 600, 602, 604 may form part of an optical sensor subsystem, such as one of the optical subsystems described with reference to FIGS. 1-3B or elsewhere herein. The set of SMI sensors 600, 602, 604 may be configured to emit light toward an eye.

The set of SMI sensors 600, 602, 604 shown in FIG. 6 includes three SMI sensors (e.g., a first SMI sensor 600, a second SMI sensor 602, and a third SMI sensor 604). The first SMI sensor 600, second SMI sensor 602, and third SMI sensor 604 may emit respective beams of light toward the eye 606. In some embodiments, the beams of light may be oriented in different directions, which different directions may or may not be orthogonal directions. When the beams of light are oriented in different directions, a processor that receives SMI signals generated by the SMI sensors 600, 602, 604 may track movement of the eye 606 in three dimensions (e.g., the processor may track angular velocities of the eye 606 in three dimensions). In contrast to the set of SMI sensors described with reference to FIG. 5, two of the beams of light impinge on the eye 606 at a same location (e.g., at a first location), and one of the beams of light impinges on the eye 606 at a different location (e.g., at a second location, different from the first location). Alternatively, all of the beams of light could be oriented to impinge on the eye 606 at a same location, or all of the beams of light could be oriented to impinge on the eye 606 at different locations.

The optical sensor subsystem including the set of SMI sensors 600, 602, 604 may also include a camera 608. Similarly to the set of SMI sensors 600, 602, 604, the camera 608 may be mounted to the head-mountable frame. The camera 608 may be positioned and/or oriented to acquire images of the eye 606. The images may be images of a portion or all of the eye 606. A processor configured to operate the optical sensor subsystem may be configured to track rotational movement of the eye 606 using images acquired by the camera 608 and SMI signals generated by the set of SMI sensors 600, 602, 604. For example, the processor may acquire a set of images of the eye at a first frequency, using the camera 608. The processor may also sample the set of one or more SMI signals at a second frequency, greater than the first frequency. The images and SMI signal samples may be acquired/sampled in parallel, in a time-overlapped manner, or at different times. In some cases, the processor may acquire one or more images; analyze the image(s) to determine a position of the eye 606 with respect to the SMI sensors 600, 602, 604 and/or beams of light emitted by the SMI sensors 600, 602, 604; and, if necessary, make adjustments to the optical sensor subsystem to ensure that the beams of light are impinging on a desired structure of the eye 606. The adjustments to the optical sensor subsystem may include, for example, one or more of adjusting a beam steering component to steer one or more beams of light, addressing and causing a particular subset of the SMI sensors 600, 602, 604 to emit light, and so on (see, e.g., the descriptions of FIGS. 7 and 8B). Alternatively (e.g., alternatively to relying on the camera 608), the SMI sensors 600, 602, 604 may be used to perform range measurements as a user moves their eye 606, and the range measurements may be mapped to an eye model to determine whether the SMI sensors 600, 602, 604 are focused on a desired eye structure. The eye model may be a generic eye model, or an eye model generated for a particular user when the optical sensor subsystem is operated in a training and eye model generation mode.

The optical sensor subsystem including the set of SMI sensors 600, 602, 604 may also include one or more light emitters 610, 612 that are capable of illuminating the eye 606 for purposes of taking an image of the eye 606 (or for other purposes). The light emitters 610, 612 may take the form of LEDs, lasers, or other light-emitting elements of a display, and so on. The light emitters 610, 612 may emit visible or non-visible light (e.g., IR light), depending on the type(s) of light the camera 608 is configured to sense. The light emitters 610, 612 may be used to provide flood, scanned, or spot illumination.

In some embodiments, a processor may use the SMI signals generated by the set of SMI sensors 600, 602, 604 to determine or track a gaze vector of the eye 606. In some embodiments, the processor may use one or more images acquired using the camera 608 to determine or track the gaze vector. In some embodiments, the processor may use one or more images acquired using the camera 608, in combination with the SMI signals, to track the gaze vector. For example, one or more images may be used to determine the gaze vector, and then the SMI signals may be used to track movement of the eye 606 and update the gaze vector (or in other words, determine movement of the gaze vector).

Figure 7:
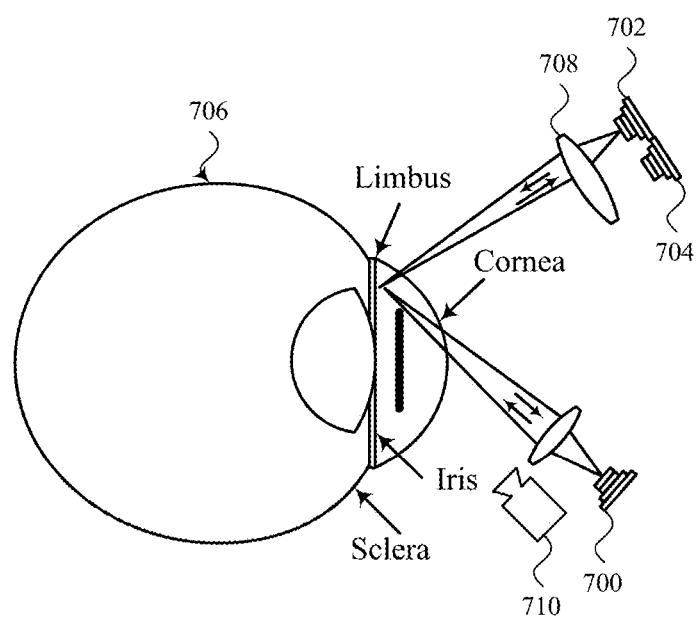
FIG. 7 shows an example side elevation view of a third alternative set of SMI sensors that may be mounted to a head-mountable frame and configured to emit light toward an eye.

FIG. 7 shows an example side elevation view of a third alternative set of SMI sensors 700, 702, 704 that may be mounted to a head-mountable frame, such as one of the head-mountable frames described with reference to FIGS. 1-3B. The set of SMI sensors 700, 702, 704 may form part of an optical sensor subsystem, such as one of the optical subsystems described with reference to FIGS. 1-3B or elsewhere herein. The set of SMI sensors 700, 702, 704 may be configured to emit light toward an eye 706.

The set of SMI sensors 700, 702, 704 shown in FIG. 7 includes three SMI sensors (e.g., a first SMI sensor 700, a second SMI sensor 702, and a third SMI sensor 704). The first SMI sensor 700, second SMI sensor 702, and third SMI sensor 704 may emit respective beams of light toward the eye 706, similarly to how beams of light may be emitted by the set of SMI sensors described with reference to FIGS. 4A and 4B (or FIG. 5, or FIG. 6). However, not all of the SMI sensors 700, 702, 704 may emit beams of light at the same time. For example, the second and third SMI sensors 702, 704 may be part of an addressable array of SMI sensors, which array may in some cases include more than two SMI sensors. The array of SMI sensors may be coupled to circuitry that can be used to address different SMI sensors or different subsets of SMI sensors in the array of SMI sensors.

In some cases, the beams of light emitted by the second and third SMI sensors 702, 704 (and in some cases, the beams of light emitted by other SMI sensors in the array of SMI sensors) may be directed toward a shared lens, a lens train, a lens array, or one or more other optical components 708.

In some cases, the optical sensor subsystem including the set of SMI sensors may also include a camera 710, which camera 710 may be used similarly to the camera described with reference to FIG. 6.

In some cases, a processor may selectively operate (e.g., activate and deactivate) different SMI sensors 702, 704 in the array of SMI sensors (or different subsets of SMI sensors) for different purposes. For example, the processor may operate (or use) the circuitry to activate a particular SMI sensor, or a particular subset of SMI sensors, having a particular focus or focuses. In some cases, the processor may cause the camera 710 to acquire one or more images of the eye 706. The processor may then analyze the image(s) to determine a gaze vector of the eye 706, and may activate one or more SMI sensors 702, 704 (in the array of SMI sensors) that are focused on a particular structure or area (or structures or areas) of the eye 706. The processor may also activate other SMI sensors, such as the SMI sensor 700.

Figure 8A:
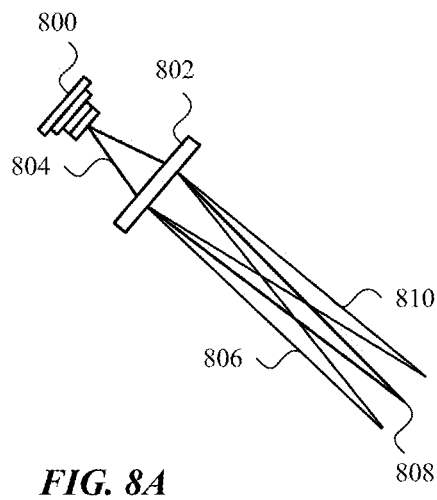
FIG. 8A shows an example use of an SMI sensor in combination with a beam splitter.

FIG. 8A shows an example use of an SMI sensor 800 in combination with a beam splitter 802. The SMI sensor 800 may be any of the SMI sensors described with reference to FIGS. 1-7, or any of the SMI sensors described hereafter. The beam splitter 802 may be positioned to split a beam of light 804 emitted by the SMI sensor. The beam may be split into multiple beams 806, 808, 810 (e.g., two, three, or more beams). In some cases, the beam splitter 802 may be associated with one or more lenses or beam steering components that redirect or steer the multiple beams 806, 808, 810. In some cases, the multiple beams 806, 808, 810 may be redirected toward a shared focus on (or in) an eye.

Figure 8B:
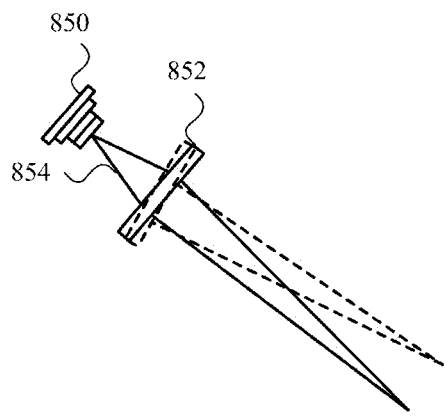
FIG. 8B shows an example use of an SMI sensor in combination with a beam steering component.

FIG. 8B shows an example use of an SMI sensor 850 in combination with a beam steering component 852. The SMI sensor 850 may be any of the SMI sensors described with reference to FIGS. 1-7, or any of the SMI sensors described hereafter. The beam steering component 852 may be positioned to steer a beam of light 854 emitted by the SMI sensor 850. A processor may be configured to operate the beam steering component 852 and steer the beam of light 854 to different structures or areas of an eye. In some embodiments, the beam steering component 852 may include a beam focusing component or lens positioning mechanism, which beam focusing component or lens positioning mechanism may be adjusted to change the focus of the beam along its axis. In some embodiments, the beam steering component 852 may be replaced with a beam focusing component.

Figure 9A:
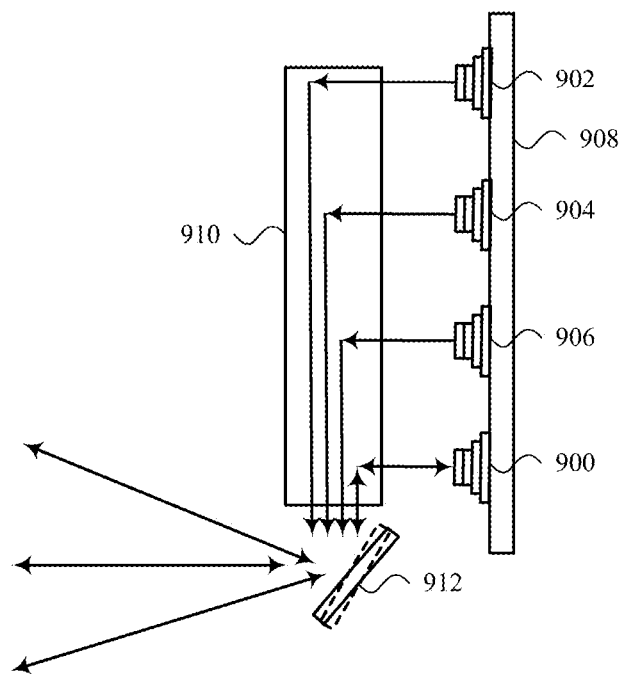
FIG. 9A shows a first example integration of an SMI sensor with a display subsystem.

FIG. 9A shows a first example integration of an SMI sensor 900 with a display subsystem. The SMI sensor 900 may be any of the SMI sensors described with reference to FIGS. 1-7, or any of the SMI sensors described hereafter. The display subsystem may be the display subsystem described with reference to FIG. 1, 3A, or 3B in some examples.

The display subsystem may include an array of display pixels 902, 904, 906 mounted or formed on a substrate 908. By way of example, the display subsystem is shown to include a blue pixel 902, a green pixel 904, and a red pixel 906, though the display subsystem may include multiple instances of each blue pixel, green pixel, and red pixel. In some cases, the display pixels 902, 904, 906 may include LEDs or other types of light-emitting elements.

The SMI sensor 900 may be mounted on the substrate 908. By way of example, the SMI sensor 900 is shown to be mounted on the substrate 908 adjacent the array of display pixels 902, 904, 906. Alternatively, the SMI sensor 900 may be mounted on the substrate 908 within the array of display pixels 902, 904, 906 (i.e., between display pixels). In some embodiments, more than one SMI sensor 900 may be mounted on the substrate 908, with each SMI sensor 900 being positioned adjacent or within the array of display pixels 902, 904, 906. In some embodiments, the SMI sensor 900 may emit IR light. In other embodiments, the SMI sensor 900 may emit visible light, ultraviolet light, or other types of light. In some embodiments, one or more of the display pixels 902, 904, 906 may be operable as SMI sensors.

A shared waveguide 910 may be positioned to guide beams of light emitted by the display pixels 902, 904, 906 and SMI sensor 900 toward a beam steering component 912, such as a set of one or more mirrors that can be moved by a microelectronic mechanical system (MEMS). In alternative embodiments, a set of waveguides (e.g., a set of optical fibers) may be used to direct light emitted by the display pixels 902, 904, 906 and SMI sensor 900 toward the beam steering component 912. A processor may operate the display pixels 902, 904, 906 and beam steering component 912 to render text, numerals, or images on a display. In some cases, the display may include one or more lenses of a pair of glasses, or a display positioned within a VR headset.

The shared waveguide 910 (or set of waveguides) may receive a returned portion of the light emitted by the SMI sensor 900, such as a portion of the light that reflects or scatters off an eye, and direct the returned portion of the emitted light toward and into a resonant cavity of the SMI sensor 900.

Figure 9B:
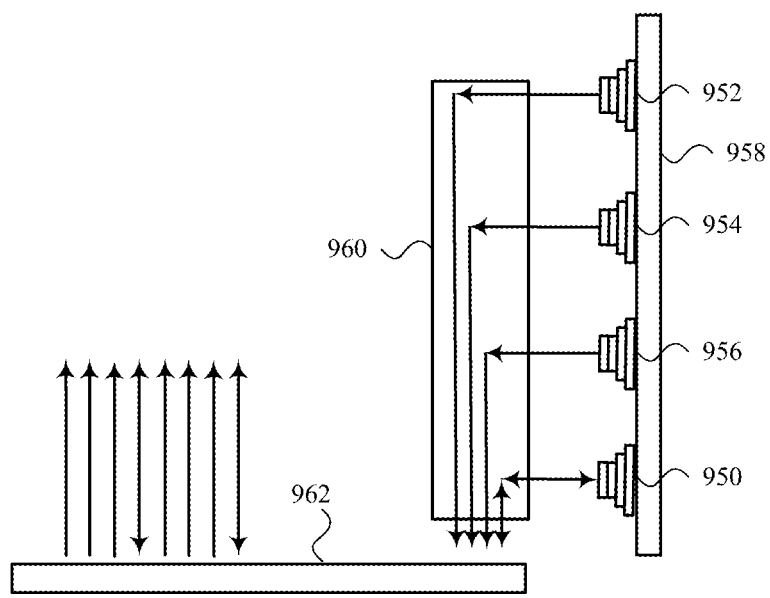
FIG. 9B shows a second example integration of an SMI sensor with a display subsystem.

FIG. 9B shows a second example integration of an SMI sensor 950 with a display subsystem. The SMI sensor 950 may be any of the SMI sensors described with reference to FIGS. 1-7, or any of the SMI sensors described hereafter. The display subsystem may be the display subsystem described with reference to FIG. 1, 3A, or 3B in some examples.

The display subsystem may include an array of display pixels 952, 954, 956 and SMI sensor 950 mounted or formed on a substrate 958. The display pixels 952, 954, 956 and SMI sensor 950 may be configured as described with reference to FIG. 9A.

A waveguide 960 (or set of waveguides) may be positioned to guide beams of light emitted by the display pixels 952, 954, 956 and SMI sensor 950 toward a further shared waveguide 962, or a distal portion of the shared waveguide 960 (or distal portions of the set of waveguides) may bend, and light may be emitted from outcouplings of the further shared waveguide 962, or from outcouplings of the distal portion(s) of the shared waveguide 962 or set of waveguides. A processor may operate the display pixels 952, 954, 956 to project text, numerals, or images on a display.

A returned portion of the light emitted by the SMI sensor 950, such as a portion of the light that reflects or scatters off an eye, may be redirected through the waveguide(s) 962, 960, and toward and into a resonant cavity of the SMI sensor 950.

Figure 10:
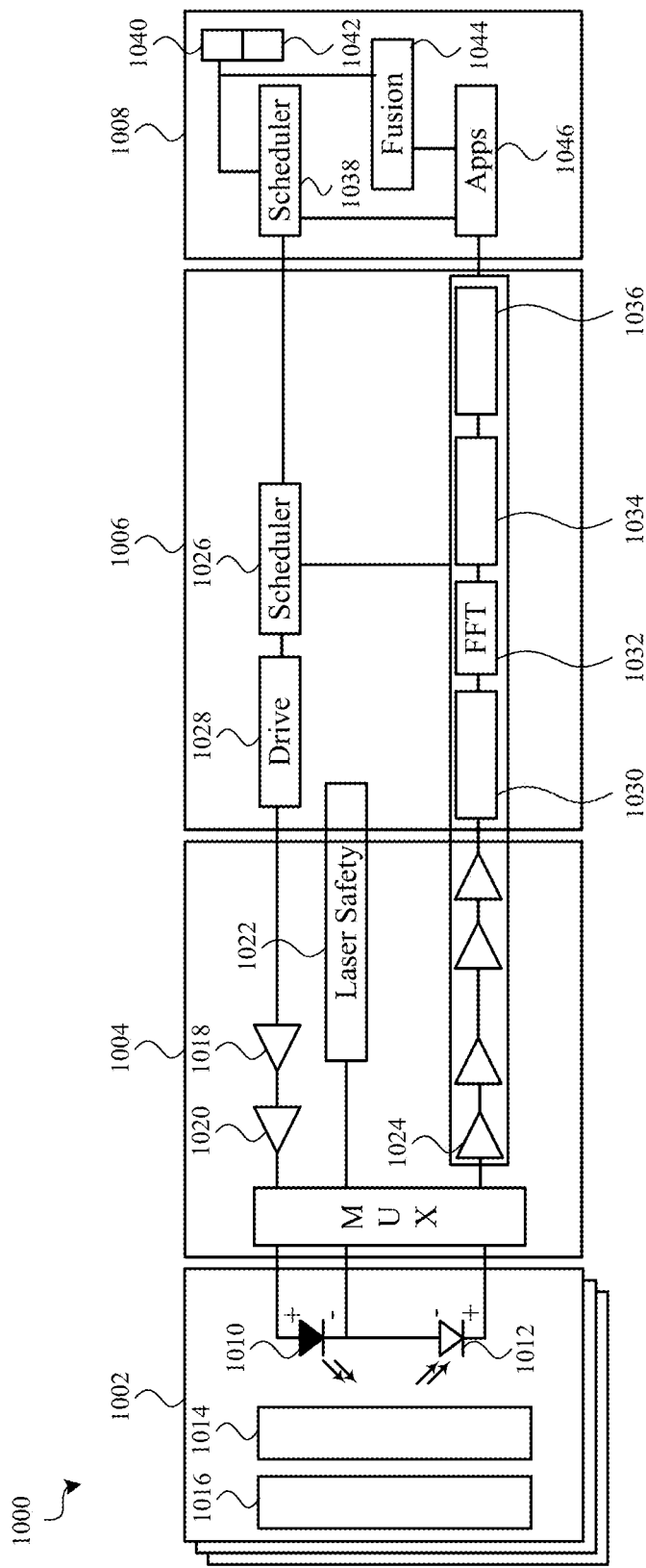
FIG. 10 shows an example set of components that may be included in an optical sensor subsystem of an eye tracking device.

FIG. 10 shows an example set of components 1000 that may be included in an optical sensor subsystem of an eye tracking device. The set of components 1000 is generally divided between a subset of optical or optoelectronic components 1002, a subset of analog components 1004, a subset of digital components 1006, and a subset of system components 1008 (e.g., a processor, and in some cases other control components).

The subset of optical or optoelectronic components 1002 may include a laser diode 1010 or another optical emitter having a resonant cavity. The components 1002 may also include a photodetector 1012 (e.g., a photodiode). The photodetector 1012 may be integrated into a same epitaxial stack as the laser diode 1010 (e.g., above, below, or adjacent the laser diode 1010), or may be formed as a separate component that is stacked with or positioned adjacent to the laser diode 1010. Alternatively, the photodetector 1012 may be replaced or supplemented with a circuit that measures a junction voltage or drive current of the laser diode 1010 and generates an SMI signal electronically (i.e., without a photosensitive element). The laser diode 1010, in combination with the photodetector 1012 or alternative circuitry for generating an SMI signal, may be referred to as an SMI sensor.

The subset of optical or optoelectronic components 1002 may also include module level optics 1014 integrated with the laser diode 1010 and/or photodetector 1012, and/or system level optics 1016. The module level optics 1014 and/or system level optics 1016 may include, for example, lenses, beam splitters, beam steering components, and so on. The module level optics 1014 and/or system level optics 1016 may determine where emitted light and returned light (e.g., light scattered off an eye) is directed.

The subset of analog components 1004 may include a digital-to-analog converter (DAC) 1018 and current regulator 1020 for converting a drive current to the analog domain and providing it to the laser diode 1010. The components 1004 may also include components 1022 for ensuring the laser diode 1010 is operated in compliance with operational safety specifications. The components 1004 may also include a transimpedance amplifier (TIA) and/or other amplifiers 1024 for amplifying an SMI signal generated by the photodetector 1012, and an analog-to-digital converter (ADC) for converting the amplified SMI signal to a digital domain. The components 1004 may also include components for correcting the SMI signal as it is amplified or otherwise processed.

In some cases, the subset of analog components 1004 may interface (e.g., be multiplexed with) more than one subset of optical or optoelectronic components 1002. For example, the components 1004 may interface with two, three, or more SMI sensors.

The subset of digital components 1006 may include a scheduler 1026 for scheduling (e.g., correlating) the provision of a drive current to the laser diode 1010 with the provision of a digitized photocurrent, obtained from the photodetector 1012, to the system components 1008. The components 1006 may also include a drive current waveform generator 1028 that provides a digital drive current to the DAC 1018. The components 1006 may further include a digital processing chain for processing the amplified and digitized output of the photodetector 1012. The digital processing chain may include, for example, a time-domain signal pre-conditioning circuit 1030, a fast Fourier transform (FFT) engine 1032, a frequency-domain signal pre-conditioning circuit 1034, and a distance and/or velocity estimator 1036. In some cases, some or all of the components 1006 may be instantiated by a set of one or more processors.

The subset of system components 1008 may include, for example, a system level scheduler 1038, which scheduler 1038 may schedule when an SMI sensor (or SMI sensors) or other components is/are used to track the position (e.g., gaze vector) or movement (e.g., angular velocity) of an eye. The components 1008 may also include other sensors, such as a camera 1040 or inertial measurement unit (IMU) 1042. In some cases, the components 1008 (or a processor thereof) may use one or more SMI signals acquired from one or more subsets of components 1002, one or more images acquired from the camera 1040, and/or other measurements (e.g., measurements acquired by the IMU 1042) to track the position or movement of an eye. The components 1008 may also include a sensor fusion application 1044 and various other applications 1046.

The laser diode 1010 may be driven using various types of drive currents. For example, the laser diode 1010 may be driven with a DC current (e.g., in a DC drive mode) for the purpose of performing a Doppler analysis on an SMI signal generated by the photodetector 1012. Alternatively, the laser diode 1010 may be driven in a frequency modulated continuous waveform (FMCW) mode (e.g., with a triangular wave drive current) when performing ranging. Alternatively, the laser diode 1010 may be driven in a harmonic drive mode (e.g., with an IQ-modulated drive current) when determining a relative displacement of an eye.

Figure 11A:
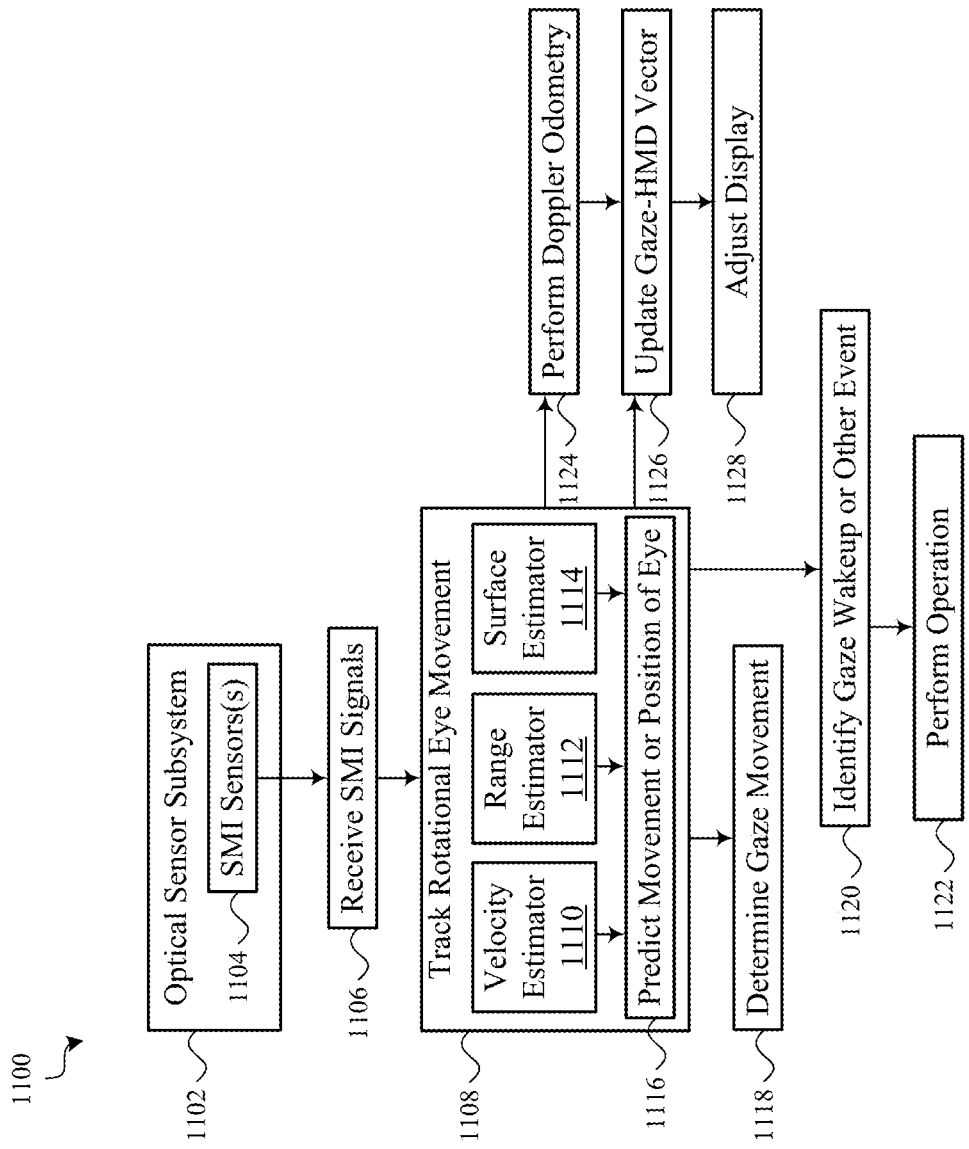
FIG. 11A illustrates a first example method for tracking eye movement using a set of one or more SMI sensors.

FIG. 11A illustrates a first example method 1100 for tracking eye movement using a set of one or more SMI sensors 1104. The method 1100 includes operating an optical sensor subsystem 1102 to cause the set of one or more SMI sensors 1104 to emit a set of one or more beams of light toward an eye of a user. The optical sensor subsystem 1102 and SMI sensor(s) 1104 may be configured similarly to any of the optical sensor subsystems and SMI sensors described herein.

At 1106, the method 1100 may include receiving a set of one or more SMI signals from the set of one or more SMI sensors 1104.

At 1108, the method 1100 may include tracking a rotational movement of the eye using the set of one or more SMI signals. The operation(s) at 1108 may include, for example, estimating (at 1110) a line and angular velocity of the eye using the SMI signals and Doppler interferometry. The operation(s) at 1108 may also include estimating (at 1112) a range (or distance) to the eye, or estimating (at 1114) a surface quality (e.g., a surface texture) of the eye. The estimated range(s) or surface quality(ies) may not only be used to estimate rotational movements of the eye, but may also be used to determine a position of the eye (at 1116), or the structure(s) of an eye on which a set of one or more SMI sensors 1104 is focused.

At 1118, the method 1100 may include using the output(s) of operation(s) 1108 to determine a gaze movement.

At 1120, the method 1100 may include using the output(s) of operation(s) 1108 to identify a gaze wakeup event (e.g., a user opening their eye, or a user looking in a particular direction, or a user performing a particular sequence of eye movements). In some cases, the operation(s) at 1120, or other operations, may include identifying a gaze sleep event (e.g., a user closing their eye, a user looking in a particular direction, or a user performing a particular sequence of eye movements), a blink event, or other events.

At 1122, the method 1100 may include performing an operation (e.g., powering a head mounted display or other device on or off, answering a call, activating an application, adjusting a volume, and so on) in response to an identified event of a particular type.

At 1124, the method 1100 may include performing Doppler odometry to determine changes in position of an eye gaze vector. In some cases, the Doppler odometry may be performed using an extended Kalman filter (EKF).

At 1126, the method 1100 may include updating a gaze-to-head mounted display (gaze-HMD) vector (i.e., determining how an eye gaze vector intersects a display, or how an eye gaze vector has moved with respect to a display).

At 1128, the method 1100 may include causing a display subsystem for the HMD (or another display) to adjust the rendering of text, numbers, or images on the display. In some cases, the adjustment may be responsive to classifying the movement of the eye (e.g., as smooth pursuit, saccade, fixation, nystagmus, or blinking).

Figure 11B:
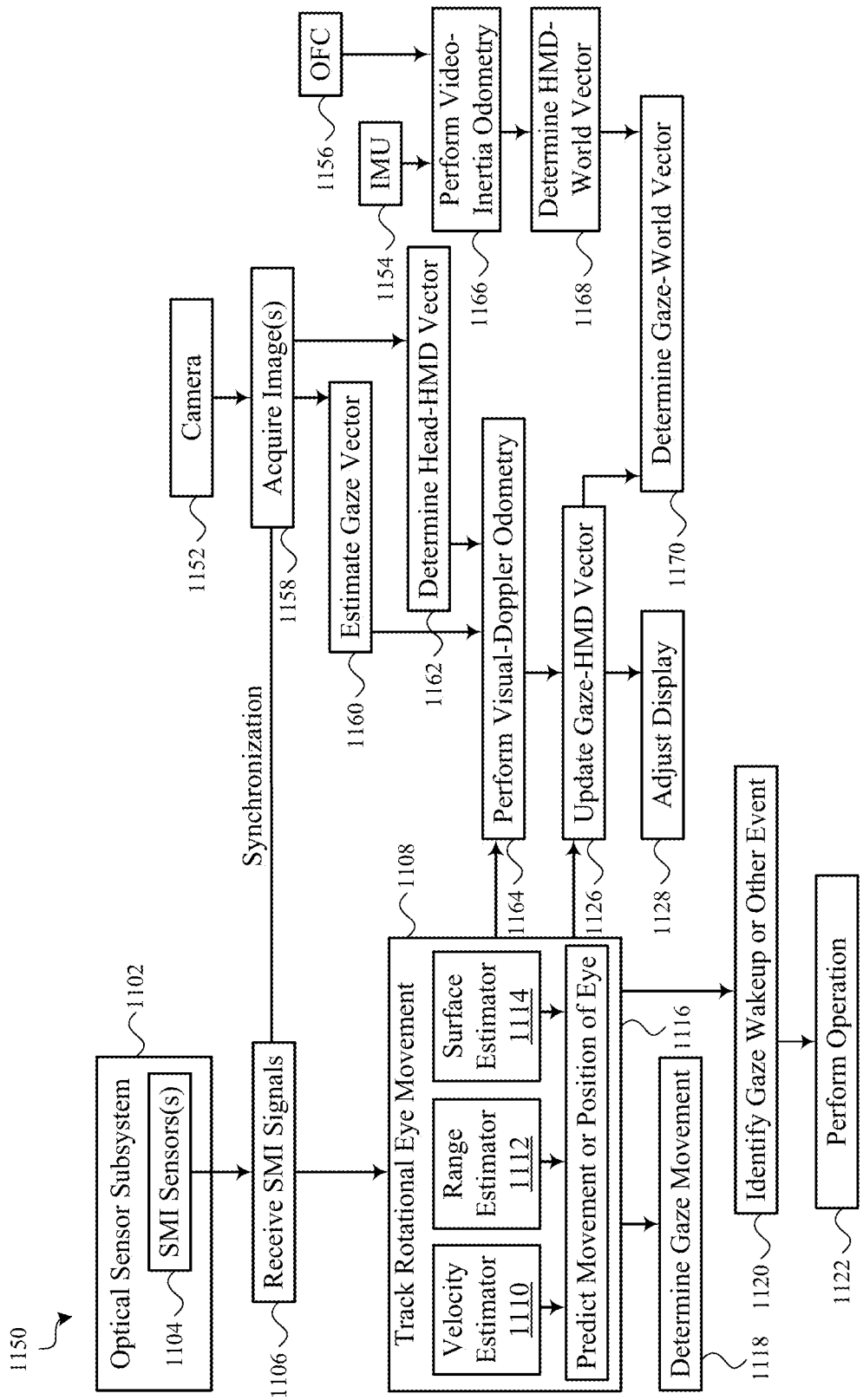
FIG. 11B illustrates a second example method for tracking eye movement, using a set of one or more SMI sensors in combination with a camera or other sensors.

FIG. 11B illustrates a second example method 1150 for tracking movement of an eye, using the set of one or more SMI sensors 1104 and operations described with reference to FIG. 11A, in combination with a camera 1152 or other sensors (e.g., an IMU 1154, outward-facing camera (OFC) 1156, and so on). The camera 1152 may be configured similarly to other cameras described herein.

At 1158, the method 1150 may include acquiring a set of one or more images of the eye using the camera 1152. In some embodiments, the camera 1152 may acquire a set of images at a first frequency, and SMI signal(s) generated by the SMI sensor(s) 1104 may be sampled at a second frequency (e.g., a second frequency synchronized with the first frequency). The frequencies may be the same or different but, in some embodiments, the second frequency may be greater than the first frequency. In this manner, the camera 1152, which typically consumes more power and produces a greater quantity of data, may be used to determine an eye position or generate gaze vector data at a lower frequency, and to make sure the SMI sensor(s) are appropriately focused and producing good data; and the SMI sensor(s) 1104, which typically consume less power, may be used more or less continuously, and at a higher frequency, to track movement of the eye (or gaze vector) between image captures by the camera 1152. In some embodiments, the images acquired by the camera 1152 may be used to generate, update, or customize an eye model, which eye model can be used to direct or focus the beam(s) of light emitted by the SMI sensor(s).

At 1160, the method 1150 may include estimating a gaze vector (or position) of the eye based on the image(s) acquired by the camera 1152.

At 1162, the method 1100 may include determining or updating a head-to-HMD vector (head-HMD vector). In other words, the method 1100 may determine how a user's head is positioned with respect to a display.

At 1164, the method 1100 may include performing visual-Doppler odometry to determine changes in position of an eye gaze vector. In some cases, the visual-Doppler odometry may be performed using an extended Kalman filter (EKF). In contrast to the Doppler odometry performed in the method 1100, the visual-Doppler odometry performed at 1164 can fuse SMI-based movement (or position) analysis of an eye with image-based position (or gaze vector) analysis of an eye.

At 1126, the method 1100 may include updating a gaze-to-head mounted display (gaze-HMD) vector (i.e., determining how an eye gaze vector intersects a display, or how an eye gaze vector has moved with respect to a display).

At 1166, the method 1100 may optionally use the output of the IMU 1154 or outward-facing camera 1156 (i.e., a camera that is focused on the environment around a user versus on the user's eye) to perform inertia odometry, video odometry, or video-inertia odometry. The video-inertia odometry may then be used at 1168 to determine or update an HMD-to-world (HMD-world) vector.

At 1170, the method 1100 may include determining or updating a gaze-world vector. Such a vector may be useful, for example, in augmenting a user's reality via a pair of glasses.

At 1128, the method 1100 may include causing a display subsystem for the HMD (or another display) to adjust the rendering of text, number, or images on the display (e.g., in an AR or VR environment). In some cases, the adjustment may be responsive to classifying the movement of the eye (e.g., as smooth pursuit, saccade, fixation, nystagmus, or blinking).

Figure 12A:
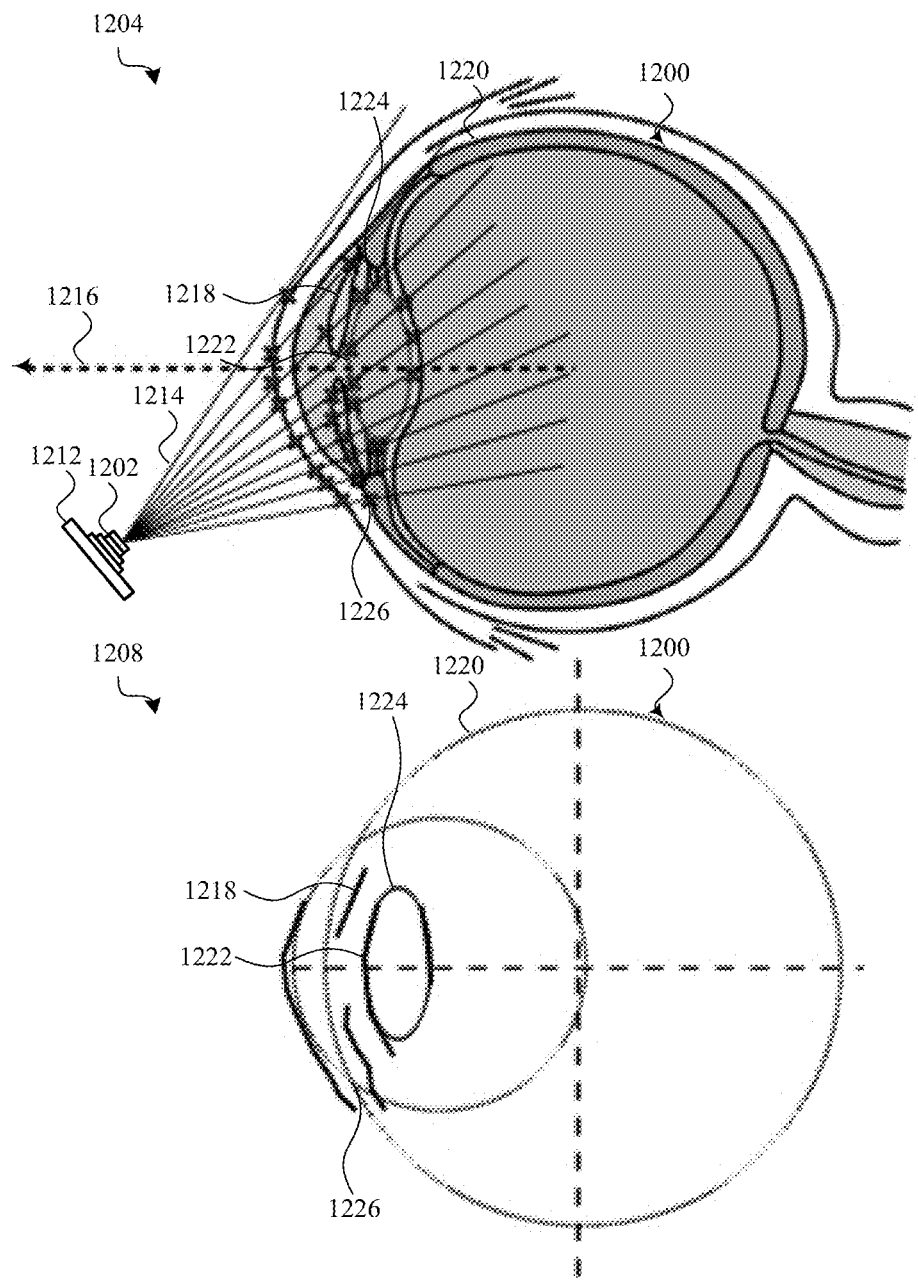
FIGS. 12A and 12B illustrate how one or more surfaces or structures of an eye may be mapped using a set of one or more SMI sensors.
Figure 12B:
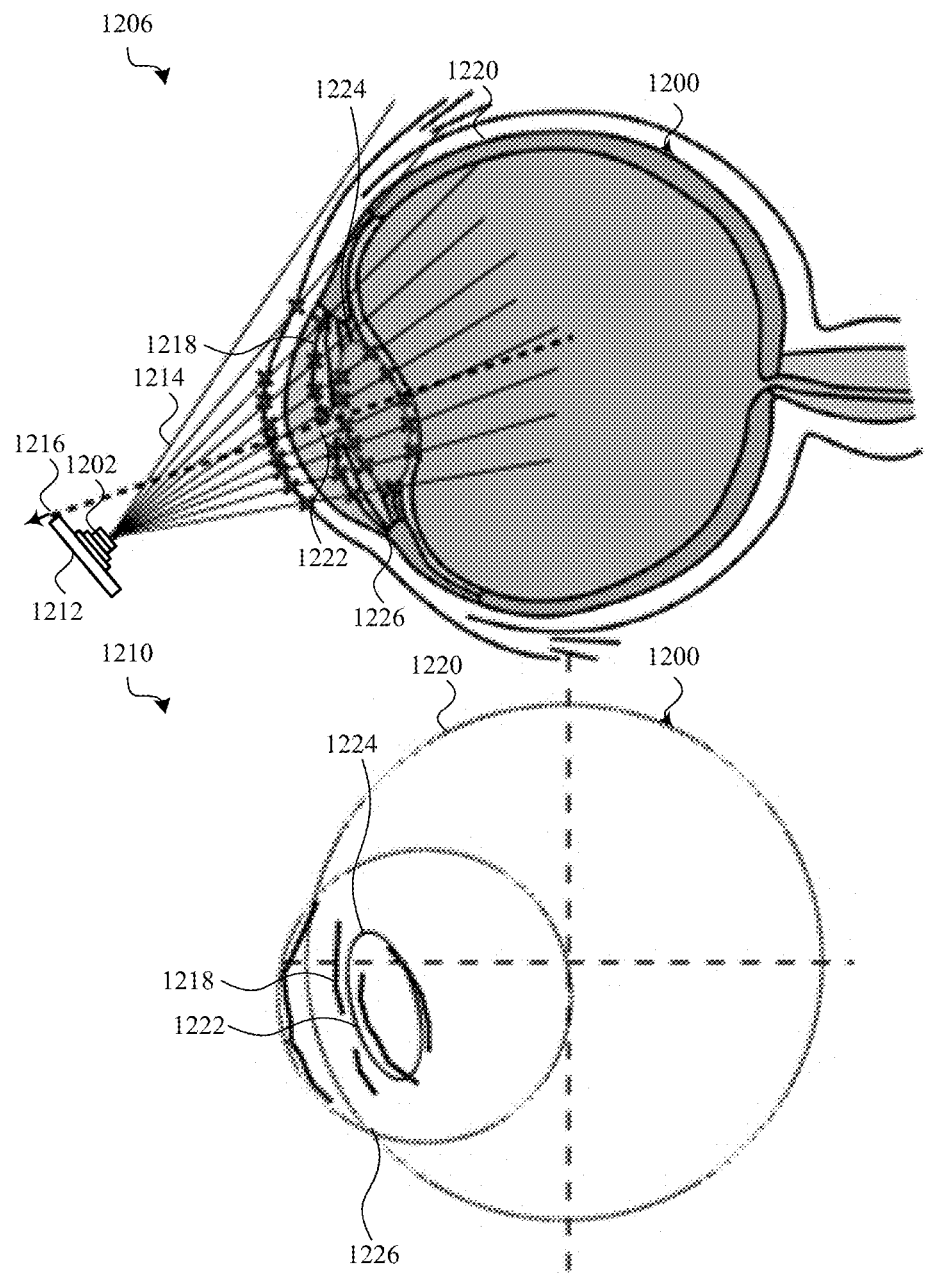

FIGS. 12A and 12B illustrate how one or more surfaces or structures of an eye 1200 may be mapped using a set of one or more SMI sensors. By way of example, FIGS. 12A and 12B show a single SMI sensor 1202. In some examples, the SMI sensor 1202 may be replaced with multiple SMI sensors (e.g., multiple discrete SMI sensors or an array of SMI sensors). The SMI sensor(s) may be any of the SMI sensors described with reference to FIGS. 1-11B.

FIGS. 12A and 12B each show two side elevations of the same eye 1200. A first side elevation in each figure (i.e., side elevations 1204 and 1206) shows a cross-section of the eye 1200, and a second side elevation in each figure (i.e., side elevations 1208 and 1210) show a computer-generated model of various eye structures identified by a processor after analyzing an SMI signal generated by the SMI sensor or multiple SMI signals generated by multiple different SMI sensors. FIG. 12A shows the eye 1200 in a first position, and FIG. 12B shows the eye 1200 in a second position.

In the case of a single SMI sensor 1202, the SMI sensor 1202 may be mounted to a head mountable frame by means of a MEMS or other structure 1212 that enables a beam of light 1214 emitted by the SMI sensor 1202 to be scanned across the eye 1200, or the beam of light 1214 emitted by the SMI sensor 1202 may be received by a set of one or more optical elements that can be adjusted to scan the beam of light 1214 across the eye 1200. Alternatively, the beam of light 1214 may be split using a beam splitter, and multiple beams of light may simultaneously, or sequentially, impinge on the eye 1200. Alternatively, the SMI sensor 1202 may be mounted to the head mountable frame in a fixed position, and a user may be asked to move their eye 1200 to different positions while the SMI sensor 1202 emits a beam of light.

A processor, such as any of the processors described herein, may receive the SMI signal(s) generated by the set of one or more SMI sensors and determine, using the SMI signal(s), a set of ranges to a set of points on or in the eye. The ranges may include absolute ranges or relative ranges. The processor may then generate a map of at least one structure of the eye using the set of ranges. The map may be a two-dimensional (2D) map or a three-dimensional (3D) map.

In some embodiments, the processor may be configured to identify, using the map, a structure of the eye, or a boundary between a first structure of the eye and a second structure of the eye. The identified structure(s) may include, for example, one or more of an iris 1218, sclera 1220, pupil 1222, lens 1224, limbus 1226, eyelid, and so on.

In some embodiments, the processor may operate an optical sensor subsystem (e.g., the MEMS, one or more optical elements, beam splitter, and so on) to direct the one or more beams of light toward an identified structure of the eye. In some cases, the structure may be more diffuse than another structure of the eye.

In some embodiments, the processor may be configured to determine, using the map, a gaze vector 1216 of the eye. In some embodiments, the processor may also or alternatively be configured to obtain or construct a Doppler cloud using a set of one or more SMI signals. The one or more SMI signals correspond with projecting or emitting multiple beams of the set of one or more beams simultaneously or sequentially, and/or scanning at least one beam of a set of one or more beams. The Doppler cloud may be obtained or constructed with or without VCSEL wavelength modulation. The processor may also or alternatively obtain or construct a depth cloud. The depth cloud may be obtained or constructed only with VCSEL wavelength modulation.

For example, when the wavelength(s) of the beam(s) of light emitted by one or more SMI sensors are modulated, and when a beam of light emitted by at least one SMI sensor is scanned and/or multiple beams are emitted, a Doppler cloud, and/or a depth cloud may be obtained or constructed. Additionally or alternatively, the Doppler cloud may be obtained or constructed when the wavelength(s) of the beam(s) of light emitted by the one or more SMI sensors are not modulated. As described earlier, a single or multiple frames of a Doppler cloud may be considered a differential depth cloud. Using measurements of a single or multiple frames of a Doppler cloud processed in real-time, a predefined and/or locally calibrated differential map or library may be matched, and/or eye tracking or position information may be extracted. As described herein, a locally calibrated differential map or library may be obtained by means including, but not limited to, a camera, a depth cloud, and so on. Further, a Doppler cloud, either alone or fused with a depth cloud or other sensing modality (e.g., an eye camera image, a motion sensor, and so on), may be used for providing an accurate and efficient way of tracking eye movement or position information.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

As described above, one aspect of the present technology may be the gathering and use of data available from various sources, including biometric data (e.g., the surface quality of a user's skin or fingerprint). The present disclosure contemplates that, in some instances, this gathered data may include personal information data that uniquely identifies or can be used to identify, locate, or contact a specific person. Such personal information data can include, for example, biometric data (e.g., fingerprint data) and data linked thereto (e.g., demographic data, location-based data, telephone numbers, email addresses, home addresses, data or records relating to a user's health or level of fitness (e.g., vital signs measurements, medication information, exercise information), date of birth, or any other identifying or personal information).

The present disclosure recognizes that the use of such personal information data, in the present technology, can be used to the benefit of users. For example, the personal information data can be used to authenticate a user to access their device, or gather performance metrics for the user's interaction with an augmented or virtual world. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide data to targeted content delivery services. In yet another example, users can select to limit the length of time data is maintained or entirely prohibit the development of a baseline profile for the user. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. An eye tracking device, comprising:
    a head-mountable frame;
    a camera;
    an optical sensor subsystem mounted to the head-mountable frame and including,
        a set of one or more self-mixing interferometry (SMI) sensors; and
    a processor configured to,
        cause the camera to acquire, at a first frequency, a set of images of an eye of a user;
        operate the optical sensor subsystem to cause the set of one or more SMI sensors to emit a set of one or more beams of light toward the eye of a user;
        sample, at a second frequency greater than the first frequency, a set of one or more SMI signals from the set of one or more SMI sensors; and
        track a movement of the eye using the set of one or more SMI signals and the set of images of the eye of the user, wherein:
    the set of one or more SMI sensors comprises:
        an array of SMI sensors; and
        circuitry configured to address different SMI sensors or different subsets of SMI sensors in the array of SMI sensors; and
    the processor is configured to selectively operate the different SMI sensors or the different subsets of SMI sensors using the circuitry.

2. The eye tracking device of claim 1, wherein tracking the movement of the eye comprises estimating an angular velocity of the eye.

3. The eye tracking device of claim 1, wherein:
    the set of one or more SMI sensors includes at least two SMI sensors; and
    the tracked movement of the eye comprises tracked angular velocities of the eye in two dimensions.

4. The eye tracking device of claim 1, wherein:
    the set of one or more SMI sensors includes at least three SMI sensors; and
    the tracked movement of the eye comprises tracked angular velocities of the eye in three dimensions.

5. The eye tracking device of claim 1, wherein the head-mountable frame comprises:
    a first lens rim and a second lens rim;
    a bridge connecting the first lens rim to the second lens rim;
    a first temple connected to the first lens rim; and
    a second temple connected to the second lens rim.

6. The eye tracking device of claim 1, further comprising:
    a display subsystem including a display mounted to the head-mountable frame.

7. The eye tracking device of claim 6, wherein:
    the processor is configured to,
        classify the movement of the eye as at least one of: blinking, smooth pursuit, saccade, fixation, or nystagmus; and
        cause the display subsystem to adjust a rendering of one or more images on the display in response to the classified movement of the eye.

8. The eye tracking device of claim 7, wherein:
    the processor is configured to,
        quantify the classified movement of the eye; wherein, the rendering of the one or more images is further adjusted in response to the quantified movement of the eye.

9. The eye tracking device of claim 6, wherein:
    the processor is configured to,
        cause the display subsystem to change a state of the display in response to the movement of the eye.

10. The eye tracking device of claim 6, wherein:
    the display subsystem includes an array of display pixels mounted on a substrate; and
    the set of one or more SMI sensors includes at least one SMI sensor mounted on the substrate, adjacent to or within the array of display pixels.

11. The eye tracking device of claim 1, wherein:
    the optical sensor subsystem includes,
        a waveguide positioned to guide a beam of light emitted by an SMI sensor, in the set of one or more SMI sensors, to multiple outcouplings of the waveguide.

12. The eye tracking device of claim 1, wherein:
    the optical sensor subsystem includes,
        a beam steering component positioned to steer a beam of light emitted by an SMI sensor in the set of one or more SMI sensors; and
    the processor is configured to operate the beam steering component and steer the beam of light.

13. The eye tracking device of claim 1, wherein:
    the optical sensor subsystem includes,
        a lens positioned to focus a beam of light emitted by an SMI sensor in the set of one or more SMI sensors; and
        a lens positioning mechanism; and
    the processor is configured to operate the lens positioning mechanism and focus the beam of light on a structure of the eye.

14. The eye tracking device of claim 1, wherein:
    the processor is configured to,
        determine a set of ranges to a set of points on or in the eye.

15. The eye tracking device of claim 14, wherein:
    the processor is configured to,
        generate a map of at least one structure of the eye using the set of ranges.

16. The eye tracking device of claim 15, wherein:
    the processor is configured to,
        identify, using the map, a particular structure of the eye of the at least one structure of the eye; and
        operate the optical sensor subsystem to direct at least one beam of light in the set of one or more beams of light toward the identified particular structure of the eye.

17. The eye tracking device of claim 14, wherein the set of ranges comprises a set of absolute ranges.

18. The eye tracking device of claim 14, wherein the set of ranges comprises a set of relative ranges.

19. An eye tracking device, comprising:
    a set of one or more self-mixing interferometry (SMI) sensors;
    a camera; and
    a processor configured to,
        cause the camera to acquire, at a first frequency, a set of images of an eye of a user;
        cause the set of one or more SMI sensors to emit a set of one or more beams of light toward the eye of the user;

sample, at a second frequency greater than the first frequency, a set of one or more SMI signals generated by the set of one or more SMI sensors;

determine a gaze vector of the eye using at least one image in the set of images; and track a movement of the eye using the set of one or more SMI signals.

20. The eye tracking device of claim 19, wherein:

the processor is configured to, update the gaze vector using the tracked movement of the eye.

21. A method of tracking movement of an eye, comprising:

operating an optical sensor subsystem to cause a set of one or more self-mixing interferometry (SMI) sensors in the optical sensor subsystem to emit a set of one or more beams of light toward the eye of a user comprising at least one of:

projecting multiple beams of the set of one or more beams simultaneously; or emitting the multiple beams sequentially; or scanning at least one beam of the set of one or more beams;

receiving a set of one or more SMI signals from the set of one or more SMI sensors; and tracking the movement of the eye using the set of one or more SMI signals, wherein tracking the movement of the eye using the set of one or more SMI signals comprises:

constructing a Doppler cloud using the set of one or more SMI signals; and extracting eye position information by matching one or more frames of the Doppler cloud to a differential map.

22. The method of claim 21, wherein tracking the movement of the eye using the set of one or more SMI signals comprises:

estimating an angular velocity of the eye using the set of one or more SMI signals.

* * * * *